Feb. 25, 1941.    M. A. WHITING    2,233,356
CONTROL SYSTEM
Filed Nov. 15, 1939
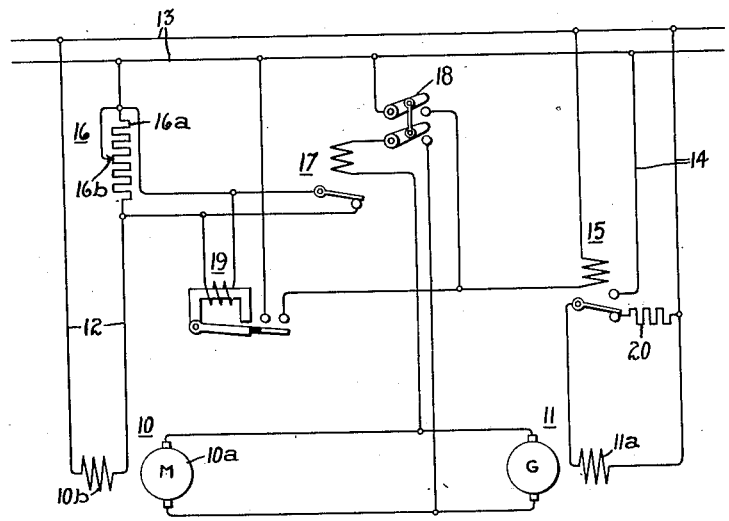
Inventor:
Max A. Whiting,
by Harry E. Dunham
His Attorney.

Patented Feb. 25, 1941

2,233,356

UNITED STATES PATENT OFFICE 2,233,356

CONTROL SYSTEM

Max A. Whiting, Schenectady, N. Y., assignor to General Electric Company, a corporation of New York Application November 15, 1939, Serial No. 304,505

4 Claims. (Cl. 172—239)

This invention relates to control systems, more particularly to systems for controlling the operation of electric motors which are supplied from variable voltage generators, and it has for an object the provision of a simple, reliable, and improved control system of this character.

In certain applications of such systems, a substantial degree of additional control is provided by designing the motor and equipping the system for a substantial degree of motor field weakening. It may be desired to initiate a retardation from any speed by the actuation of a single control circuit, whereupon a suitable sequence of motor field strengthening and generator field decay is obtained.

In one embodiment of the invention an electric motor is connected to be supplied from a variable voltage generator. The motor is provided with means for controlling its speed by varying its field strength, and a control device is provided for initiating retardation of the motor. Means responsive to operation of this control device are provided for strengthening the field of the motor to decrease its speed, together with a time element device for initiating reduction of the generator voltage an interval of time after initiation of the motor field strengthening which is dependent upon the amount of field weakening of the motor.

For a better and more complete understanding of the invention, reference should now be had to the following specification and to the accompanying drawing, the single figure of which is a simple, diagrammatical illustration of an embodiment of the invention.

Referring now to the drawing, the armature 10a of an electric motor 10 is connected to be supplied from a variable voltage generator 11 which is driven at a suitable speed, which is preferably substantially constant, by any suitable driving means (not shown).

Motor 10 is provided with a field winding 10b which is connected by means of conductors 12 to a suitable source of excitation supply which is represented by the two supply lines 13. Similarly, the generator 11 is provided with a field winding 11a which is arranged to be connected to the source of excitation 13 by means of conductors 14 and a suitable switching device illustrated as an electromagnetically actuated contactor 15.

A motor field rheostat 16 comprising a variable resistor 16a and a movable contact 16b is provided for varying the field strength of the motor to vary its speed.

Suitable means illustrated as an electromagnetically actuated contactor 17 are provided for short-circuiting the rheostat 16 and removing the short circuit therefrom. The operating coil of this contactor receives its excitation from the voltage of generator 11. Accordingly, this contactor may be designed and adjusted so that during the acceleration of motor 10 by the rise of voltage of generator 11, the motor field weakening will begin at any predetermined desired value of generator voltage. A control device illustrated as a manually operated switching device 18 is provided for controlling the acceleration and retardation of the motor 10.

A time element device illustrated as a magnetic time delay relay 19 is provided for preventing decay of the field of generator 11 and reduction of its voltage for an interval of time following the operation of control device 18 to decelerate the motor 10. Relay 19 has a relatively massive core and armature, each having an ample cross-section composed of solid, i. e., unlaminated, iron or steel having a low electrical resistivity and a high flux capacity. When the coil of relay 19 has been fully energized and is then deenergized, the decay of flux in the relay core is delayed by eddy currents induced in the iron. This effect may be increased, if necessary, by surrounding the core of relay 19 with a copper sleeve. Furthermore, the deenergization of the coil of relay 19 is effected by short-circuiting the coil upon itself instead of opening the circuit. Thereby, the current induced in this coil by the decay of the flux in the core further delays the decay. Relay 19 is so designed that the minimum flux at which it will hold its contacts closed is much less than its maximum flux.

By means of a non-magnetic shim in the air gap, it is possible to provide that residual magnetism cannot prevent relay 19 from opening after all of its exciting currents, either applied or induced, have vanished.

With the foregoing understanding of the elements and their organization in the system, the operation of the system will readily be understood from the following detailed description.

Assume that rheostat 16 is adjusted for its maximum resistance. Switch 18 is closed. Contactor 15 picks up and connects generator field 11a to source 13 to excite the generator field. The generator voltage and, accordingly, the motor speed rise. At a predetermined value of generator voltage contactor 17 picks up and opens its contact, thereby cutting the rheostat 16 into circuit. This, of course, weakens the motor field. In conjunction with the remainder of the rise of generator voltage, this accelerates the motor to maximum speed.

The IR drop of rheostat 16 is impressed upon the coil of relay 19. Accordingly, relay 19 picks up and closes its contacts. Relay 19 is now in readiness to perform its function.

At maximum speed of the motor, and weak motor field, the switch 18 is opened when desired to effect a retardation of motor 10. Immediately contactor 17 drops out, and closes its contacts and thereby short-circuits rheostat 16. Since the maximum flux of relay 19 is considerably more than is required to hold it closed, the relay does not drop out instantly. Hence its contacts remain closed and hold contactor 15 picked up and the generator field connected to the source irrespectively of the opening of switch 18. Thus the first part of the motor retardation occurs by reason of motor field strengthening only.

After an interval of time the flux of relay 19 decreases to a value at which the relay armature drops out. This opens the holding circuit for the coil of contactor 15 so that contactor 15 now drops out and short-circuits the generator field on discharge resistor 20. The generator field now begins to decay, and the remainder of the deceleration of the motor takes place as a result of decrease of generator voltage or of a combination of the remainder of the motor field strengthening and the generator voltage decay.

Now assume that only part of rheostat 16 is turned in and that the motor is operating at an intermediate value of field current and speed. When the next retardation ensues, the motor field, beginning at more than minimum value, will take less time than before to reach a strength at which the decay of the generator field may safely be begun. Relay 19 meets this requirement. The partially weakened field has a greater IR drop than the fully weakened field and hence the voltage impressed on the coil of relay 19 is less than it was in the case of the fully weakened field. Thus, at the beginning of the retardation the core of relay 19 has less flux than it had in the case of the retardation from the weakest field, and consequently, its armature drops sooner. In other words, the time interval of the drop-out operation of relay 19 is roughly proportional to the amount of field weakening actuation of rheostat 16.

When only a small part of rheostat 16 is turned in, it is proper for the decay of the generator field and the strengthening of the motor field to begin simultaneously. When only a small part of the rheostat is turned in, the IR drop across it is insufficient to pick up relay 19. Consequently, when switch 18 is opened, the motor field strengthening and generator field decay begin simultaneously.

It is possible to delay the initiation of the generator field decay by the use of a relay having its coil connected directly in series with the motor field. Such a relay may be fitted with a set of contacts which open when the relay picks up in consequence of the increase of motor field current. Such contacts may be used to deenergize the generator field, for example, by controlling a contactor such as 15 in the drawing. Such an arrangement is open to the objection that if the relay is adjusted for a pick-up current intended to be very nearly the maximum field of the motor, a slight change of operating conditions may cause the relay to fail to pick up. Thus the remainder of the retardation, intended to be caused by generator field decay, would fail to occur. In a planer, for example, such a failure to complete a retardation would be troublesome and perhaps damaging.

In my invention the desired delay in the initiation of the generator field decay is obtained solely by the magnetic stored energy of relay 19, which is inevitably dissipated by induced currents within its magnetic members and coil. Hence, (provided ordinary precautions are taken in the original design of the relay, as pointed out hereinbefore), the relay cannot fail to drop out regardless of whether it is adjusted for its longest possible drop-out time. In fact, if desired, relay 19 may be designed for sufficient delay so that the effects of motor field strengthening and generator field decay are not overlapped at all.

Although in accordance with the provisions of the patent statutes, this invention has been described as embodied in concrete form and the principle of the invention has been described, together with the best mode in which it is now contemplated applying that principle, it will be understood that the element and connections shown and described are merely illustrative and that the invention is not limited thereto, since alterations and modifications will readily occur to persons skilled in the art without departing from the true spirit of the invention or from the scope of the annexed claims.

What I claim as new and desire to secure by Letters Patent of the United States is:

1. A control system comprising in combination, a generator provided with means for varying its voltage, an electric motor connected to be supplied from said generator, means for varying the field strength of said motor to vary its speed, a control device for controlling the retardation of said motor, means responsive to operation of said control device for strengthening the field of said motor to decrease its speed, and time element means operable in response to said operation of said control device for rendering said generator voltage varying means active to decrease said generator voltage after an interval of time proportional to the amount of actuation of said motor field strength varying means.

2. A control system comprising in combination, a generator, means for varying the voltage of said generator, a motor connected to be supplied from said generator, means for varying the field strength of said motor to vary its speed, a control device for controlling the starting and stopping of said motor, means responsive to starting operation of said control device for actuating said voltage varying means to increase the voltage of said generator and for subsequently actuating said motor field varying means to weaken the field of said motor and responsive to stopping operation of said control device for rendering said motor field strength varying means active to strengthen said motor field, and time element means set in operation in response to said stopping operation for rendering said voltage varying means active to reduce the voltage of said generator an interval of time after said stopping operation of said control device.

3. A control system comprising in combination, a generator, means for varying the field strength of said generator to vary its voltage, an electric motor connected to be supplied from said generator, means for varying the field strength of said motor, a control device for controlling the acceleration and retardation of said motor, means responsive to an operation of said control device for actuating said generator field varying means to increase the generator voltage, means responsive to a predetermined voltage of said generator for actuating said motor field varying means to weaken the field of said motor, said voltage responsive means also being responsive to another operation of said control device for actuating said motor field varying means to strengthen the field of said motor, and a time element device responsive to said last operation of said control device for actuating said generator field varying means to weaken the field of said generator after an interval of time proportional to the amount of said field weakening of said motor.

4. A control system comprising in combination, a generator, means for varying the voltage of said generator, an electric motor connected to be supplied from said generator, a variable resistor in the field circuit of said motor for varying the strength of its field, a control device for controlling the acceleration and retardation of said motor, means responsive to an operation of said control device for actuating said generator voltage varying means to increase the voltage of said generator, means responsive to a predetermined voltage of said generator for rendering said resistor active to weaken the field of said motor, electrical connections arranged to be controlled in response to another operation of said control device for controlling said resistor to strengthen the field of said motor, and time element means responsive to said last mentioned operation of said control device for actuating said voltage varying means to decrease the voltage of said generator, said time element means comprising a relay having its operating coil connected in parallel with said resistor whereby its time interval of operation is approximately proportional to the amount of field weakening of said motor.

MAX A. WHITING.